United States Patent
Honeck et al.

(10) Patent No.: US 6,824,040 B2
(45) Date of Patent: Nov. 30, 2004

(54) METHOD AND APPARATUS FOR LINEAR VIBRATION WELDING

(75) Inventors: Randy G. Honeck, Maple Grove, MN (US); Christopher R. Osdick, Lindstrom, MN (US); Robert J. Fawkes, Maplewood, MN (US)

(73) Assignee: Forward Technology Industries, Inc., Minneapolis, MN (US)

( * ) Notice: Subject to any disclaimer, the term of this patent is extended or adjusted under 35 U.S.C. 154(b) by 0 days.

(21) Appl. No.: 10/103,153

(22) Filed: Mar. 21, 2002

(65) Prior Publication Data

US 2002/0148878 A1 Oct. 17, 2002

Related U.S. Application Data

(60) Provisional application No. 60/277,755, filed on Mar. 21, 2001, and provisional application No. 60/277,757, filed on Mar. 21, 2001.

(51) Int. Cl.[7] .......................... B23K 5/20; B23K 20/12; B23K 31/12
(52) U.S. Cl. ...................... 228/110.1; 228/1.1; 228/2.1; 228/102; 228/112.1
(58) Field of Search ............................ 228/113, 110.1, 228/111–114.5, 102, 103, 1.1, 2.1, 2.3; 156/73.1, 73.2, 73.3, 73.5, 580

(56) References Cited

U.S. PATENT DOCUMENTS

| | | | |
|---|---|---|---|
| 3,819,961 A | * | 6/1974 | Bourgeois et al. ........... 310/8.1 |
| 3,920,504 A | | 11/1975 | Shoh et al. ................. 156/580 |
| 4,348,908 A | * | 9/1982 | Shoh ....................... 73/862.541 |
| 4,377,428 A | | 3/1983 | Toth .......................... 156/73.5 |
| 4,609,806 A | * | 9/1986 | Grabkowski et al. ......... 219/95 |
| 4,844,320 A | | 7/1989 | Stokes et al. .............. 228/102 |
| 4,936,502 A | | 6/1990 | Shlarb et al. ............... 228/102 |
| 5,160,393 A | * | 11/1992 | Snyder ....................... 156/73.5 |
| 5,225,647 A | * | 7/1993 | Dufrenne ................. 219/86.51 |
| 5,468,336 A | | 11/1995 | Lotz et al. ............... 156/580.2 |
| 5,562,242 A | * | 10/1996 | Manzo et al. ................ 228/2.1 |
| 5,833,127 A | * | 11/1998 | Powell et al. ............... 228/102 |
| 5,849,146 A | | 12/1998 | Searle |
| 5,855,706 A | | 1/1999 | Grewell et al. ............... 156/64 |
| 5,858,142 A | * | 1/1999 | Tully et al. ................. 156/73.5 |
| 5,936,320 A | | 8/1999 | Takeda et al. ................. 310/89 |
| 6,091,215 A | * | 7/2000 | Lovett et al. ............... 318/254 |
| 6,145,730 A | * | 11/2000 | Wiesemann ............... 228/112.1 |
| 6,152,350 A | * | 11/2000 | Hayashi et al. ............. 228/102 |
| 6,273,980 B1 | | 8/2001 | Akiyama et al. .......... 156/73.5 |
| 6,280,566 B1 | | 8/2001 | Naito et al. ............. 156/580.1 |
| 6,404,154 B2 | * | 6/2002 | Marcinkiewicz et al. ... 318/254 |
| 2002/0108998 A1 | * | 8/2002 | Simon ........................ 228/1.1 |

FOREIGN PATENT DOCUMENTS

| | | |
|---|---|---|
| JP | 11-150963 | 6/1999 |
| JP | 167931 | 6/2000 |

* cited by examiner

*Primary Examiner*—L. Edmondson
(74) *Attorney, Agent, or Firm*—Patterson Thuente, Skaar & Christensen, P.A.

(57) ABSTRACT

The method of controlling a linear vibration welding apparatus, in accordance with the invention, may comprise the steps of: fastening a first workpiece portion in a fixed position; fastening a second workpiece portion to a reciprocating member; energizing a first single winding magnet with direct current power to create a magnetic field; sensing a location of the reciprocating member with respect to a zero point; and energizing a second magnet when the reciprocating member has crossed the zero point when moving towards the first magnet. The linear vibration welding apparatus in accordance with the invention may comprise: a frame; a flexure array; a first magnet assembly; a second magnet assembly; a digital controller; and direct current amplifiers for powering the magnet assemblies.

24 Claims, 5 Drawing Sheets

METHOD AND APPARATUS FOR LINEAR VIBRATION WELDING

This application claims the benefit of priority to U.S. provisional application No. 60/277,755, filed on Mar. 21, 2001 and U.S. provisional application No. 60/277,757, filed on Mar. 21, 2001, both incorporated herein by reference in their entirety.

FIELD OF THE INVENTION

The present invention relates to vibration welding machinery, and more particularly to an apparatus and method for controlling the motion of a linear vibration welding device.

BACKGROUND OF THE INVENTION

Vibration welding is used to join two workpieces made of thermoplastic. Items such as automobile bumpers, interior decorations, grilles, and lights are commonly formed using vibration welding techniques. An advantage of the vibration welding process is the reduced joining time when compared to adhesive bonding and heated tool welding.

Vibration welding works by frictionally working two plastic pieces under pressure, thereby heating and melting their contact surfaces. Once the whole surface is melted, reaching the so-called steady-state melt flow phase, the friction generating process is stopped and the parts form a bonded high-strength structure upon cooling.

Friction is generated by rubbing the two pieces together in an oscillatory fashion under pressure. There are two main types of vibration welding. The first, linear, involves one-dimensional oscillation of a workpiece. The second, orbital, involves biaxial oscillation of a workpiece. The range of oscillation frequencies used is typically between 80 and 300 Hz. In contrast, ultrasonic welding operates at frequencies of about 25 KHz. The amplitude of the oscillations for linear vibration welding is typically between 50 and 100 thousandths of an inch. The clamping force between the two parts is typically between 1000 and 5000 pounds force.

A linear vibration welding device most generally comprises a flexure member and a means for vibrating the flexure member. The prior art devices, such as U.S. Pat. No. 3,920,504, to Shoh et al., utilize one electromagnet at each end of the flexure array to generate a magnetic field to cause the flexure array to vibrate. These electromagnets are driven by a three-phase alternating current (AC) drive source, such as a variable frequency drive (VFD). This prior art AC drive system possesses several undesirable characteristics.

The use of three-phase AC power requires a large power input for a given amount of work output. Three-phase AC power possesses three poles separated by 120 degrees of phase between each pole. This makes AC well suited to rotary motion but not linear motion, which requires a 180 degree linear oscillatory motion. To make the AC system function, one of the two electromagnets receives both power coils, while the other magnet receives a single coil. A Scott T-connection is used, as shown in FIG. 10 of Shoh, to approximate a 180-degree phase alternation of the current. However, the approximated two-phase system does not eliminate all three-phase properties. Therefore, there is a series of counterproductive forces introduced to the system.

The counterproductive forces are those forces that urge the flexure array in a direction opposite that of its intended movement. Such forces work against the drive force, resulting in a net reduction in the drive force. A significantly larger drive is therefore required to achieve the necessary net drive force to weld a workpiece. The large drive consumes a correspondingly larger amount of power. Additionally, the frame for such device must be larger and heavier to handle the competing forces without premature failure.

The startup time for the prior art AC drive system is also disadvantageously lengthy. Startup time is the time it takes the machine to reach a constant maximum amplitude at the resonance frequency for the system. The startup time directly affects the welding process. Vibration speeds of about 35 inches per second and higher cause melting for most plastics. Speeds below about 20 inches per second will only cause the material to heat, not melt. The vibration speeds between these two values cause considerable amounts of particulates to be generated. This may cause poor welds, environmental concerns, machine interference and mess.

The use of three-phase AC power also disadvantageously requires the use of an autotuning system. The spring constants for flexure arrays used in vibration welders are very high, such as several hundred thousand pounds force per inch. Consequently, the flexure array will only move at or around its resonance frequency. This resonance frequency varies with the weight of the tool attached to the array. Therefore, the welding device must be "tuned" prior to use with a given tool.

The tuning step for conventional vibration welders relies on approximation based upon the user's best guess. The operator simply varies the frequency input to the drive motor and listens to the audible hum. When the hum reaches its loudest point, the operator assumes that the amplitude has peaked.

An autotuning procedure became feasible with the advent of cost effective controls. Autotuning comprises the provision of an amplitude sensor and automated frequency adjustment controls to the welding apparatus. The frequency is first "turned on" at a predetermined starting level with a low power input. Then the frequency is stepped in increments of approximately 0.1 Hz while the sensor measures the amplitude. At the point where the amplitude begins to drop off, the stepping is discontinued. From the plot of amplitude versus frequency (at a fixed power level), the operating frequency is chosen where the peak displacement occurred.

A so-called soft start is used when autotuning. The power input is initially started low to ensure that the flexure member does not overextend and damage the drive magnets. Once the resonance frequency is determined, the power input is then increased to achieve a desired amplitude. This autotuning procedure adds time to the welding process, which reduces productivity.

An alternative method of autotuning is to introduce a known frequency to the system and monitor how it responds. The response is measured. Then a resonance frequency can be determined based upon the measured response. This method of autotuning exhibits the same deficiencies as the above-described stepping method.

The drive frequency of the prior art apparatus cannot be easily varied during a welding procedure. The viscosity of the interface between two work pieces being joined by vibration welding varies with the temperature and matter phase of the interface between the pieces. The viscosity may either increase or decrease, depending on the properties of the materials being joined, during a given weld procedure. The amplitude will increase given a decrease viscosity and constant power and frequency inputs. The opposite is true for increasing viscosity. Therefore, the prior art AC devices must vary one of the power or frequency inputs to the system to ensure that the amplitude is kept within a range to prevent damage to the machine and to ensure a good weld.

The prior art mechanisms do not have the ability to vary frequency during the weld process, so the power must be adjusted. The power rating of the drive mechanisms must be sufficiently oversized to allow for increased power needs of the system. Larger drive motors increase the cost of the overall apparatus.

The amplitude adjustment of the prior art devices is reactionary. The controller uses position information to compare the allowable amplitude range to a measured amplitude value. The controller is then able to determine whether the amplitude value is over or under the pre-set amplitude. The controller varies the power input to the drive motors to correct for the over or under amplitude condition. Then the amplitude is again compared to determine if the correction brought the amplitude back into a proper range.

This prior art reactionary method of adjusting the amplitude involves a considerable lag time between initial apprehension of the out of bounds condition until the condition is corrected. Several periods of flexure travel may occur before the problem is corrected. This lag in response time can have adverse effects on both the workpiece and on the apparatus itself. Some thermoplastic materials used in vibration welding processes can change viscosities very rapidly during a joining process. Because of this quick change and lag in apparatus adjustment, damage to the workpiece and the drive magnets can occur due to an over-amplitude condition.

Finally, the prior art three-phase AC drive vibration welders do not provide for the ability to weld by energy. Welding by energy, as is often used in ultra-sonic welding, involves inputting a known amount of energy into the workpiece to create a weld. Welding by energy requires knowing how much energy is inputted in to the system and what percentage of that energy actually goes into the given workpiece. True weld by energy cannot be used with a three-phase AC system because one cannot easily measure the deductions necessary to account for the counterproductive forces.

In summary, conventional vibration welders have several significant disadvantages. Their AC power systems require large and costly drive motors, the frame must be correspondingly large and the overall system is slow to come up to speed. The AC drive system requires an autotuning function with a soft start. The method of adjusting the amplitude is reactionary and there is no method for welding by power. Additionally, the prior art apparatuses tend to be complex, costly and inefficient. Therefore, there is a need to provide a method and apparatus for vibration welding that addresses these disadvantages in whole or in part.

SUMMARY OF THE PRESENT INVENTION

Disclosed are a method for controlling a linear vibration welding apparatus and an apparatus for same. The method, in accordance with the invention, may comprise the steps of: fastening a first workpiece portion in a fixed position; fastening a second workpiece portion to a reciprocating member; energizing a first single winding magnet with direct current power to create a magnetic field; sensing a location of the reciprocating member with respect to a zero point; and energizing a second magnet when the reciprocating member has crossed the zero point when moving towards the first magnet. The linear vibration welding apparatus in accordance with the invention may comprise: a frame; a flexure array; a first magnet assembly; a second magnet assembly; a digital controller; and direct current amplifiers for powering the magnet assemblies.

The present invention addresses the disadvantages present in conventional linear vibration welders. The present invention possesses increased efficiency by driving the electromagnet assemblies with direct current. The use of direct current eliminates the counterproductive forces present in three phase AC drive systems. The increased efficiency allows the apparatus to perform with approximately twice the welding power relative to a comparably sized conventional linear vibration welder. The DC drive system, in conjunction with digital controls, allows for dynamic modulation and predictive adjustment of the amplitude of the flexure array during a welding process. This eliminates the need for autotuning of the apparatus and minimizes the risk of overdrive related damage. The digital controls also allow for welding by power to be implemented.

DETAILED DESCRIPTION OF THE INVENTION

Figure 1:
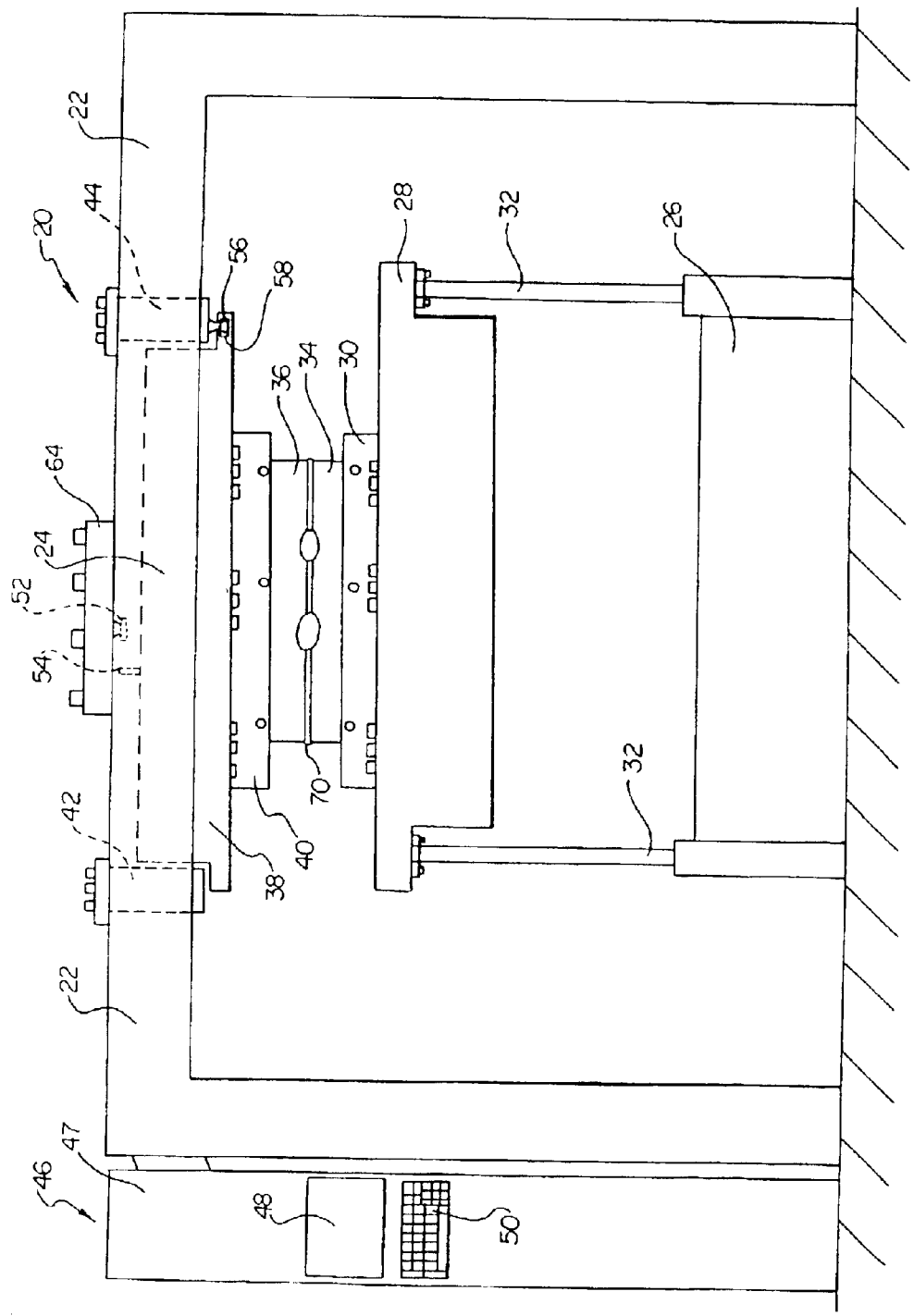
FIG. 1 is a front view of a linear vibration welding apparatus in accordance with the present invention.

FIG. 1 illustrates a linear vibration welding apparatus 20 according to the present invention. The welding apparatus 20 generally comprises a frame 22, a flexure or vibratory assembly 24 provided to the frame 22, an extendable table assembly 26 provided below the flexure assembly 24 and a control housing 46 electrically connected to the table assembly 26 and the flexure assembly 24.

The table assembly 26 comprises a base or table 28 supported by one or more hydraulic struts 32. The table assembly 26 is rigidly fastened to the floor below the flexure assembly 24 or, alternatively, to the frame 22. The struts 32 enable the table 28 to be controllably raised and lowered during the welding process. The struts 32 are preferably capable of generating between 1000 and 5000 pounds of force. A first clamp 30 is rigidly fastened to the base 28. The first clamp 30 is configured to securely hold a work piece first portion 34 during the welding operation.

The control housing 46 comprises an electrical cabinet 47 for housing a plurality of electrical, power and control devices. The cabinet 47 is preferably provided with a graphical display 48 for displaying system functions and status information, and an input device 50 for allowing a user to input commands into the control devices. Alternatively, the display 48 is a touch screen that integrates the input device functions. The control housing 46 is electrically connected to a power source, the flexure assembly 24 and the table assembly 26.

Figure 2:
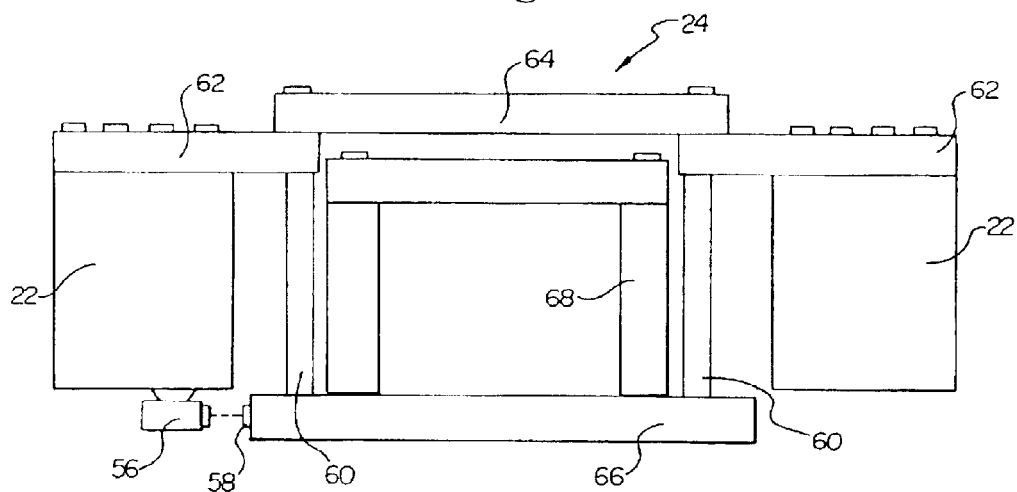
FIG. 2 is an end view of a linear vibration welding apparatus in accordance with the present invention.
Figure 3:
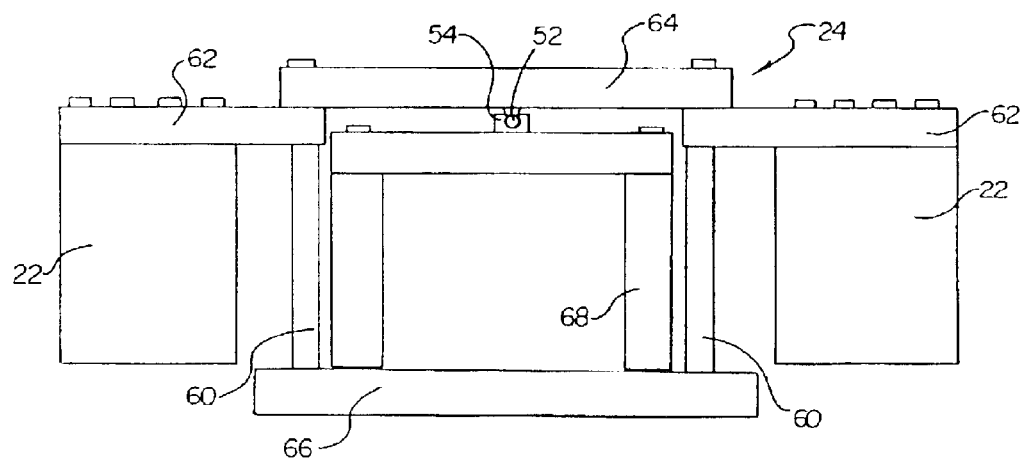
FIG. 3 is an end view of a linear vibration welding apparatus in accordance with the present invention.

Referring to FIGS. 1, 2 and 3, the flexure assembly 24 comprises two frame connection members 62, two flexure members 60, a base plate 66, a force transfer member 68 and a transverse brace 64. The frame connection members 62 are secured to the frame 22 and to the top of the flexure members 60. The base plate 66 is secured to the bottom of the flexure members 60. The base plate 66 receives a second clamp 40 for securing a workpiece second portion 36. The force transfer member 68 is fastened to the base plate 66. Alternatively, the base plate 66 and force transfer member 68 are unitarily formed.

The force transfer member 68 is aligned with a respective first magnet assembly 42 and second magnet assembly 44. The force transfer member 68 is attractable to the magnet assemblies 42, 44 when said assemblies 42, 44 are energized to create an attractive magnetic field. Thus, the flexure member 60 is subjected to a shearing force due to its bottom portion moving with respect to its fixed top portion. A transverse brace 64 is secured to the respective frame connection members 62. The transverse brace 64 adds rigidity to the assembly 24 and counters resonation of the frame 22 and assembly 24 combination. Collectively, the base plate 66, flexure members 60 and force transfer members 68 may be referred to as the flexure array 38.

One or more position sensors 52, 56 are provided to the welding apparatus 20 as shown in FIGS. 1–3. The sensors may be either analog sensors 52 or digital encoders 56. The analog sensor 52 is fastened to the transverse brace 64. A target 54 is provided to the top of the flexure array 38. The analog sensor 52 determines the distance between the target 54 and the sensor 52. This information is then relayed to control devices.

A digital encoder 56 may be used in addition to or in place of the analog sensor 52. The digital encoder 56 is preferably a digital optical linear encoder. The encoder 56 functions as a feedback device to provide flexure array position information to control devices. The encoder 56 is preferably provided to a portion of the frame 22 as shown in FIGS. 1 and 2. A target 58 is affixed to the side of the base plate 66. The encoder 56 determines the position of the array 38 by sensing the relative position of the target 58. The target 58 is a sticker with visible gradations scannable by the encoder 56.

Figure 4:
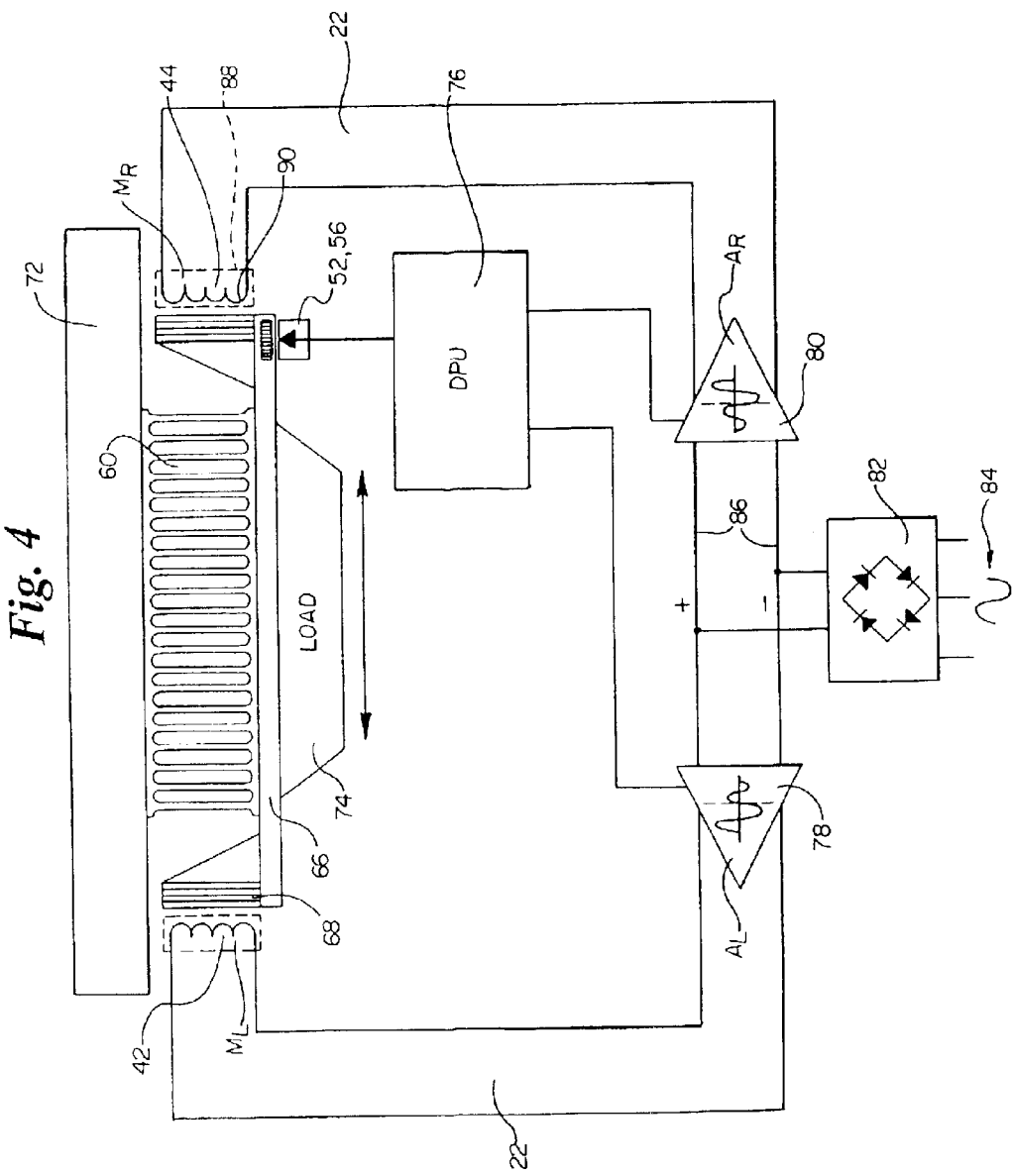
FIG. 4 is an electromechanical schematic diagram of the linear vibration welding apparatus in accordance with the present invention.

The electrical schematic for the vibration welding apparatus according to the present invention is illustrated in FIG. 4. A mass 72 is provided to the flexure array 38 to adjust the weight of said array 38. The weight of the array 38 affects the resonance frequency. Less mass equals higher resonance frequencies. Conversely, more mass equals lower frequencies. Flexure member 60 and force transfer member 68 are shown to represent the flexure array 38 in FIG. 4. The load 74 represents the frictional force acting on the system during a welding operation.

A first magnet assembly 42 and second magnet assembly 44 are provided to either side of the force transfer member 68. Each magnet assembly 42, 44 is secured to the frame 22. The magnet assemblies 42, 44 may be designated as right $M_R$ and left $M_L$ for control purposes, which will be explained further hereinbelow. Each electromagnet assembly 42, 44 comprises a magnetic core 88 and a single coil of wire 90 wound around that core 88 to provide a pair of opposed single pole electromagnets.

The magnet assemblies 42, 44 are each operably connected to a respective amplifier 78, 80. Amplifiers 78, 80 may be designated as $A_R$ and $A_L$ for control purposes. The amplifiers 78, 80 are preferably bi-polar DC amplifiers, such as commercially available four quadrant DC brush servo amplifiers.

An AC-DC power source 82 provides the power to the amplifiers. The input current 84 is AC three-phase and the output current 86 is a constant DC voltage. Typically, the input voltage is 240 VAC and the output is 375 VDC. Suitable AC-DC power sources 82 are known to those skilled in the art and are available from a variety of commercial suppliers.

A digital processor unit (DPU) 76 is operably connected to the DC amplifiers 78, 80. The DPU 76, in the most basic sense, controls the timing of the magnetic field generation that drives the flexure array 38 in a linear periodic fashion. The DPU 76 is programmed to perform a variety of control functions, as will be described below. The DPU 76 used in the preferred embodiment is a servo motion controller. Suitable servo motion controllers are available from Delta Tau Data Systems, Inc.

The DPU 76 is electrically connected to a position sensor, such as the analog sensor 52 or the digital sensor 56. These sensors 52, 56 provide the DPU 76 with position information for the flexure array 38. The DPU 76 uses the positional information to predict the position and/or the amplitude of the flexure array for a subsequent swing of the flexure array 38. Said prediction, or peak displacement, of the amplitude is based upon calculating the velocity of the array 38 at the point it passes through the zero point. The array 38 is at its maximum velocity at such time. The DPU 76 can then signal the appropriate amplifiers 78, 80 to dynamically adjust the amplitude, frequency or both of the flexure array 38. The DPU 76 can also measure the desired weld energy input as defined by the user. The DPU 76 then performs a weld operation to input the desired weld energy, often defined in joules, to the workpiece and ceases the welding operation when the defined energy has been transferred.

Figure 5:
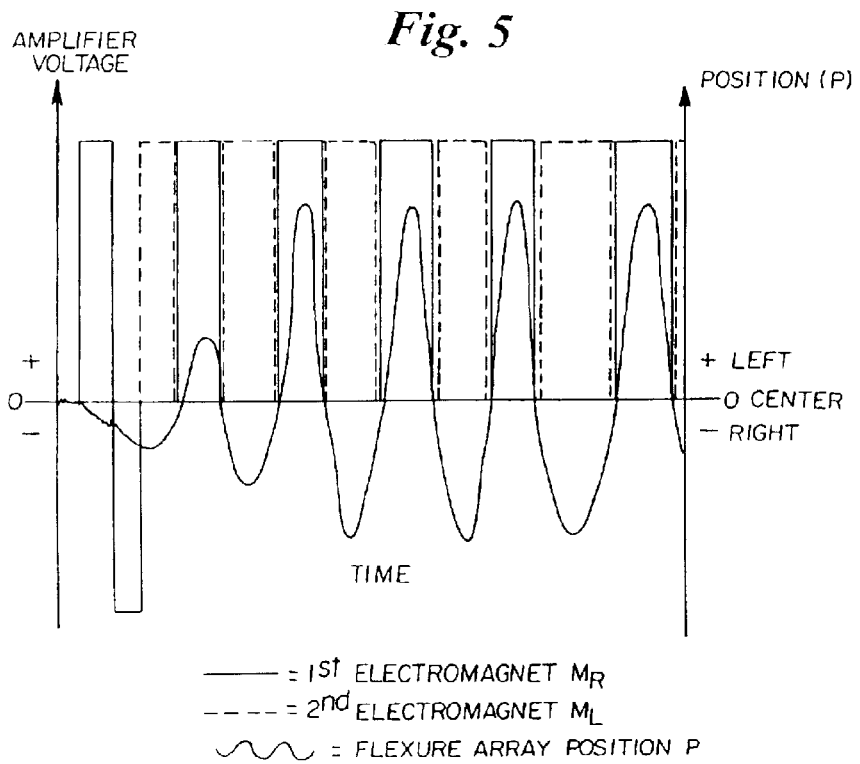
FIG. 5 is a graph illustrating the energization of the electromagnets and the position of the flexure array with respect to time of the linear vibration welding apparatus.

The particular energization scheme of the present invention allows the welding apparatus 20 to have a significantly increased efficiency with respect to conventional linear vibration welders. FIG. 5 graphically illustrates the energization of the flexure array 38 with respect to array position P. The left vertical axis represents the voltage input into each of the respective first 42 and second 44 magnet assemblies $M_L$ and $M_R$ as provided from a respective amplifier $A_L$ and $A_R$. (The amplifiers 78, 80 and magnet assemblies 42, 44 could receive the opposite designations as well.) The right vertical axis represents the position of the flexure array 38. Zero is taken to be the relaxed position for the array 38. Positive and negative values are either right or left of center, respectively, depending on the designation of one direction being positive and the other negative. Here, positive values are defined to be left of center. The horizontal axis of FIG. 5 represents elapsed time.

Starting at zero seconds, the array 38 is centered at the zero position. The first electromagnet $M_R$ is then energized. The input voltage is represented as a square wave because it is a DC voltage. The right electromagnet $M_R$ then generates a magnetic field that attracts the array 38 to the right, as shown. Then the magnet $M_R$ is pulsed with the opposite polarity to repel the array 38 from the right and urge it to the left. After the repulsion, the left magnet $M_L$ is energized to pull the array 38 to the left as well. This right pull followed by a left push, left pull is only employed to start the flexure array 38 oscillating from rest. Following this startup routine the $M_R$ and $M_L$ magnets are alternatingly energized for the remainder of the weld process. During the welding process, the input energy is varied to each of the magnet assemblies 42, 44 by the DPU 76 to maintain the desired amplitude of the flexure array 38.

Figure 6:
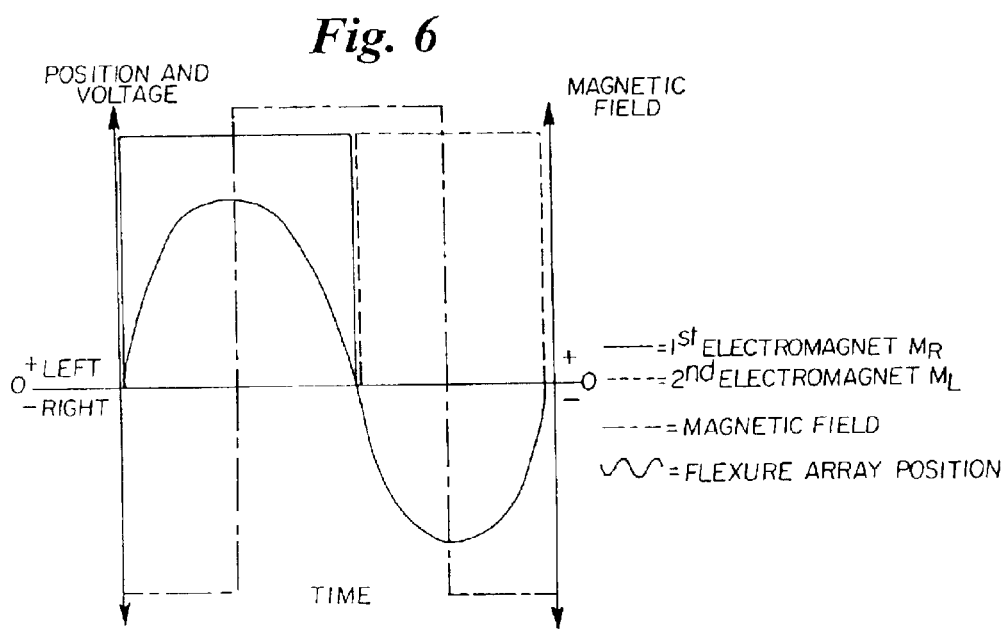
FIG. 6 is one period taken from the graph from FIG. 5 showing the relative phase of the magnetic field with respect to position and applied voltage of the flexure assembly of the linear vibration welding apparatus.

It will be appreciated that the plot of position P versus the energization of the respective magnets 78, 80 reveals that a given magnet 78, 80 is first energized when the array passes the zero point going away from that magnet 78, 80. This can be more clearly seen in FIG. 6, which presents only one period of flexure array travel. As shown, as soon as the array 38 passes to the right of zero, the left magnet $M_L$ is energized. This may be seemingly counterproductive; however, the magnetic field takes time to build in the electromagnet. This lag time is shown in the graph to be approximately one quarter of a period.

The advantage of driving the array 38 with such timing is that the array 38 is at its farthest amplitude, away from a given magnet 78, 80 when that magnet begins to pull the array 38 towards that magnet. Thus, the array 38 is urged in the new direction by both the spring force of the flexure members 60 and by the magnetic force of the electromagnet 78, 80. This increases the efficiency of the overall apparatus 20 compared with conventional vibration welders because there are no wasted forces to overcome. This increased efficiency allows the welding apparatus 20 to use approximately half the drive force for a comparative load or, to drive twice the load for comparatively sized drive motors.

Figure 7:
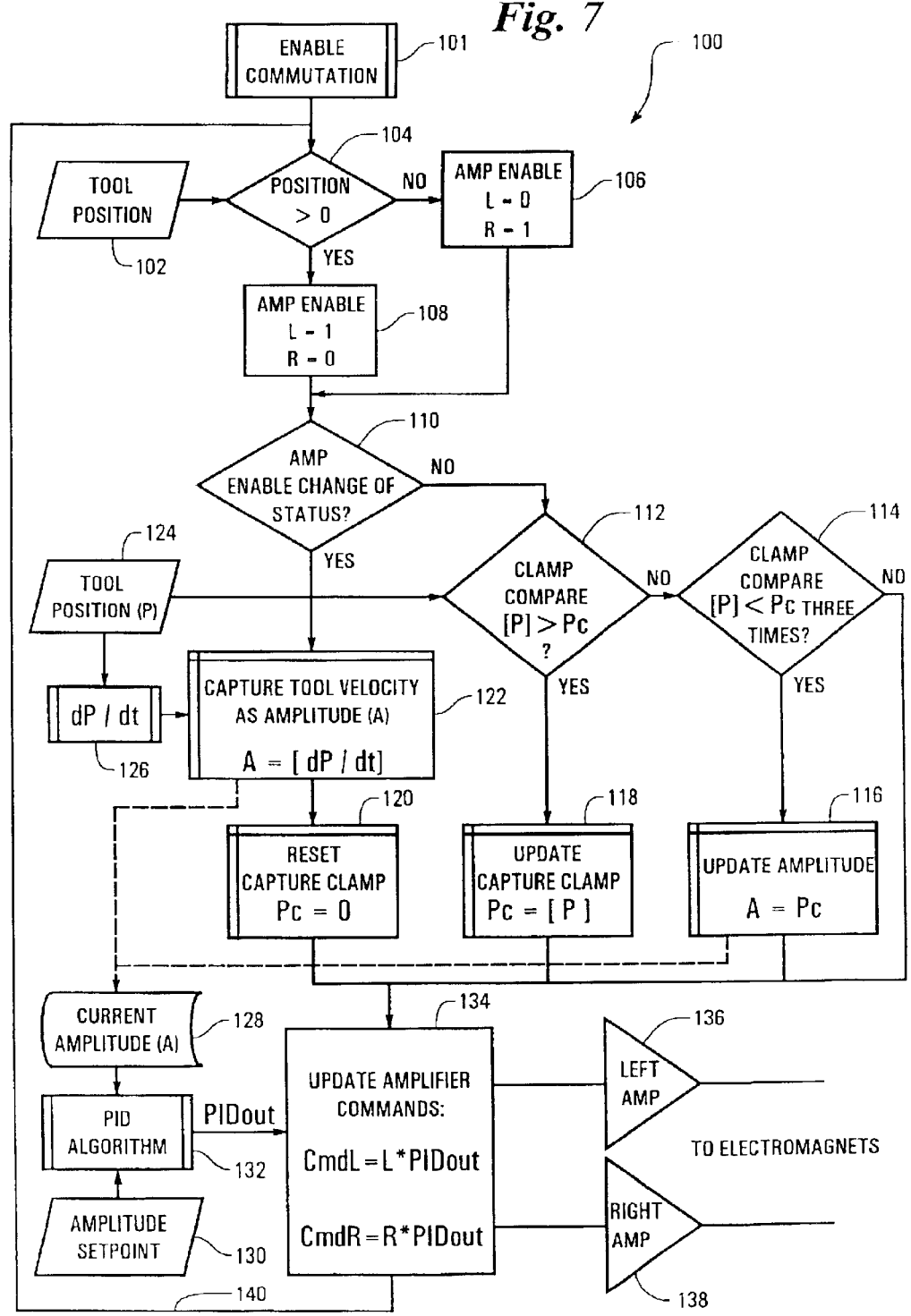
FIG. 7 is a logic flowchart depicting program control of the linear vibration welding apparatus.

The algorithm 100 employed by the present invention is represented in the logic diagram of FIG. 7. This algorithm 100 allows the welding apparatus to operate without the need to autotune and to dynamically and predictively adjust the amplitude of the flexure array 38. The logic indicated in FIG. 7 and described herein is programmed into a control chip included in the DPU 76 using a programming language suited to controls and known to those of ordinary skill in the art.

This algorithm is performed each clock cycle. The indicated process starts with a commutation enablement routine 101. This signifies that the routine to be run is for a continuous operation, such as the welding of a part. From there, the position sensor 52, 56 provides a tool position reading. The tool refers to either the flexure array 38 or the workpiece second portion 36. The zero point is the centered position between the first magnet 42 and second magnet 44. The position sensor 52, 56 reports whether the position P is positive or negative 104. Positive values for this description are defined as any value right of center and negative as those left of center. Those skilled in the art will recognize that the positive and negative definitions could be chosen in an opposite manner.

Based upon the position P of the flexure array or tool 38 being positive or negative, the DPU 76 centers the tool 38. For negative values, the right electromagnet $M_R$ is energized 106. For positive values, the left electromagnet $M_L$ is energized 108. The value of zero is indicative of a "power off" condition. The value of one is indicative of a "power on" condition.

Next, the DPU 76 determines whether the position P of the tool 38 changed from the previous iteration of the loop 110. The change of position is compared to the last defined position at the reference point in the previous cycle. Thus, a storage value (Pc) for the position of the tool is defined within the DPU 76. If the status has not changed, then the absolute value of the position is compared to the Pc value 112. If the Pc is not greater than the absolute value of the position, then the absolute value is compared to the Pc three times 114. After three successive readings where the tool 38 has a position absolute value of less than the Pc value, the amplitude value (A) is defined as the Pc value 216. The purpose of taking three successive readings before updating the value is for noise filtering. If there is an anomalous spiked value, this will be disregarded because three successive values are needed. Those skilled in the art will recognize that such filtering may be accomplished with more or less than 3 successive readings without departing from the scope of the invention. If the absolute value of the position is not less than the Pc value, then step 134 is invoked.

If, in step 112, the absolute value of the position is greater than the Pc value, the Pc value is updated by defining the Pc value as that absolute positional value reading 118. Now, both of the values stored in variable placeholder A and Pc are defined for further operations.

Referring back to step 110, if the position of the tool 38 has crossed the centerline (zero position), then the tool velocity dP/dt is defined as the amplitude A in step 122. The DPU 76 relies on a tool position P reading 124 and calculates a differential of the position with respect to time (dP/dt) 126. The differential calculation is performed as an embedded controller function in the servo motion controller 76 used in the preferred embodiment. This embedded dP/dt function calculates such differentials as part of a servo conditioning algorithm.

After the A value is established, it is stored in data placeholders. Step 128 indicates the amplitude A being stored as the most current value. Item 130 refers to an amplitude setpoint. The amplitude setpoint is an amplitude value predetermined by the operator of the welding apparatus. Both the amplitude setpoint and the amplitude A variables are fed into a proportional derivative algorithm (PID) 232 that is functionally included in the servo motion controller 76. The PID algorithm determines error values and corrects the output for said errors before output to the DC amplifier command output 134.

The next step is the output of the amplifier commands 134. This step takes the corrected output from step 132 and calculates a command to either turn each DC amplifier 78, 80 on or off. The command to the left amplifier 136 is the L value of steps 106 or 108 times the PID output value. The command to the right amplifier is the R value of steps 106 or 108 times the PID output value. Each of these Left commands and Right commands is then outputted to their respective DC amplifier 136 and 138 to either turn the amp on or off as required. The cycle is then repeated or iterated by cycling 140 back to step 104.

In operation, referring again to FIG. 1, the electromagnets 42, 44 alternately pull on the flexure array 38, thereby providing a linear oscillation of the upper plate and consequently the workpiece second portion 36. The electromagnets 42, 44 are alternately energized in a fashion as described above to linearly oscillate flexure array at its resonant frequency. As the workpiece second portion 36 is oscillating, the hydraulic struts 32 press the workpiece first portion 34 against the second portion 36 with a predetermined force. The resulting friction between the first 34 and second 36 portions causes heating and melting at the interface 70. When the interface 70 is sufficiently melted, the oscillations are stopped. The workpiece is then allowed to cool, thereby fusing the first 34 and second 36 portions.

Although the present invention has been described with reference to the preferred embodiments, workers skilled in the art will recognize changes may be made in form and detail without departing from the spirit and scope of the invention.

What is claimed is:

1. A method of vibration welding a workpiece, the method comprising the steps of:
    fastening a first workpiece portion to a fixed position;
    fastening a second workpiece portion to a linearly reciprocating member, the reciprocating member operably connected to a flexure assembly comprising a plurality of flexure members, the flexure members developing a spring force responsive to a displacement of the reciprocating member from a relaxed position substantially centered at and defining a zero point, the spring force operable to urge the reciprocating member to return to the relaxed position;
    energizing a first single winding magnet with direct current power to create a first magnetic field, whereby the reciprocating member is urged in a first direction by the first magnetic field and simultaneously urged towards the relaxed position by the spring force developed by the flexural members when the reciprocating member is displaced from the relaxed position;
    sensing a location of the reciprocating member with respect to the zero point, the reciprocating member having a first maximum displacement from the zero point toward the first single winding magnet defining a first amplitude and a second maximum displacement from the zero point toward a second single winding magnet defining a second amplitude; and
    energizing die second single winding magnet with direct current power when the reciprocating member has crossed the zero point while moving towards the first single winding magnet to create a second magnetic field in the second single winding magnet, wherein the second magnetic field is maximized when the reciprocating member is at the first amplitude, thereby urging the reciprocating member in a second direction by a combination of the spring force of the flexure members and the second magnetic field.

2. The method of claim 1, further comprising the step of predicting the amplitude of the reciprocating member by trajectory modeling.

3. The method of claim 2, further comprising the step of controllably adjusting the energization of one or both of the first and the second single winding magnets to affect the amplitude of the reciprocating member.

4. A method of reducing tool over-travel at a weld part interface in a vibration welding operation, the method comprising the steps of:
    defining a reference point for a trajectory of a linearly reciprocating member, the reciprocating member being operably connected to a flexure assembly comprising a plurality of flexure members, the flexure members capable of developing a spring force responsive to a displacement of the reciprocating member from a relaxed position substantially centered at and defining a zero point, the reference point being located with respect to the zero point, the spring force operable to urge the reciprocating member towards the relaxed position;
    defining an amplitude for a reciprocating member based on a reference point;
    sensing a location of the reciprocating member with respect to the reference point;
    predicting a subsequent amplitude of the reciprocating member; and
    adjusting power input to a single winding magnet to alter the amplitude of the reciprocating member.

5. The method of claim 4, further comprising the step of calculating the velocity of the reciprocating member.

6. The method of claim 4, further comprising the steps of:
    fastening a first workpiece portion to a fixed position; and
    fastening a second workpiece portion to the reciprocating member, the reciprocating member having a relaxed position defining a zero point.

7. The method of claim 4, further comprising the step of relaying the location to a controller.

8. A method for dynamically controlling a linear vibration welding operation, the method comprising the steps of:
    sensing a first tool position of a linear vibration welding tool with respect to a zero point, the vibration welding tool being operably connected to a flexure assembly comprising a plurality of flexure members, the flexure members configured to develop a restoring spring force responsive to a displacement of the vibration welding tool from a relaxed position substantially centered at and defining the zero point, the spring force acting to urge the vibration welding tool towards the relaxed position;
    determining if the first tool position changed with respect to a stored tool position;
    determining a tool velocity;
    determining a predicted subsequent tool position; and
    outputting a control command to an amplifier based upon the predicted subsequent tool position.

9. The method of claim 8, further comprising the step of centering the tool at the zero point, the zero point located midway between a first magnet and a second magnet.

10. The method of claim 8, further comprising the step of defining an amplitude for the tool based upon the tool velocity.

11. The method of claim 8, further comprising the step of updating the stored tool position to be equal to the first tool position.

12. The method of claim 11, further comprising the step of inputting the amplitude and an amplitude setpoint value into a proportional integral derivative algorithm.

13. A method for monitoring a vibration welding operation, the method comprising:
    a step for sensing a first tool position of a linear vibration welding tool with respect to a zero point, the vibration welding tool being operably connected to a flexure assembly comprising a plurality of flexure members, the flexure members configured to develop a restoring spring force responsive to a displacement of the vibration welding tool from a relaxed position substantially centered at and defining the zero point, the spring force acting to urge the vibration welding tool towards the relaxed position;
    a step for determining if the tool position changed with respect to a stored tool position;
    a step for determining a tool velocity;
    a step for calculating a predicted tool position; and
    a step for outputting a control command.

14. The method of claim 13, further comprising a step for updating the stored tool position.

15. The method of claim 14, further comprising a step for inputting the amplitude and an amplitude setpoint value into a proportional integral derivative algorithm.

16. An apparatus for vibration welding apparatus comprising:
    a frame;
    a flexure array operably connected to the frame, the flexure array having a first end, a second end, and a plurality of flexure members, each flexure member movable between a flexed configuration and an unflexed configuration at least in part by a spring force of the flexure members;

a first magnet assembly disposed on the frame, the first magnet assembly comprising a single pole electromagnet;

a second magnet assembly disposed on the frame, the second magnet assembly comprising a single pole electromagnet;

a digital controller operably connected to the first magnet assembly and the second magnet assembly;

a first direct current amplifier electrically connected to the first magnet assembly and the digital controller;

a second direct current amplifier electrically connected to the second magnet assembly and the digital controller;

a target disposed on the flexure assembly; and a position sensing device provided to the frame and operably connected to the digital controller, wherein the position sensing device determines the position of the flexure array relative to the target, wherein the digital controller predicts a subsequent tool position based upon the position relayed by the position sensing device.

17. The apparatus of claim 16, wherein the position sensing device is an analog sensor.

18. The apparatus of claim 16, wherein the position sensing device is a digital sensor.

19. The apparatus of claim 16, further comprising:

a first clamp operably connected to the flexure array; and a second clamp rigidly disposed on a table assembly.

20. The apparatus of claim 16, wherein the digital controller selectively energizes one of the first magnet assembly or second magnet assembly based upon the predicted subsequent tool position.

21. A vibration welding apparatus comprising:

a frame;

a flexure assembly operably connected to the frame, the flexure assembly comprising:

a plurality of flexure members, each flexure member having a top surface and a bottom surface, the flexure members rigidly fastened to the frame by way of a frame connection member fastened to the top surface and to the frame such that each flexure member is movable in part between a flexed configuration and an unflexed configuration by a spring force of the flexure members;

a base plate fastened to the bottom surface of the flexure members;

a force transfer member having a first end and a second end, the force transfer member fastened to the base plate;

a first direct current electromagnet assembly provided to the frame and in operable communication with the first end of the force transfer member; and a second direct current electromagnet assembly provided to the frame and in operable communication with the second end of the force transfer member, wherein the force transfer member is linearly oscillatable between the first electromagnet assembly and the second electromagnet assembly, thereby defining an amplitude;

a position sensor provided to the flexure assembly for determining the position of the force transfer member relative to a zero point, the zero point defined to be the position of the force transfer member at rest; and a controller operably connected to the first electromagnet assembly, the second electromagnet assembly and the position sensor, the controller selectively controlling the energization of the first electromagnet assembly and second electromagnet assembly so that one of the first electromagnet assembly and second electromagnet assembly is energized to create a maximum magnetic field when the force transfer member passes the zero point in a first direction while traveling towards one of the second electromagnet assembly and first electromagnet assembly, respectively, thereby urging the force transfer member in a second direction through a combination of the spring force and the magnetic field.

22. The apparatus of claim 21, wherein the controller predicts the position of the force transfer member by performing a proportional integral derivative calculation.

23. The apparatus of claim 21, further comprising a graphical user interface operably connected to the controller, the interface for displaying system information.

24. The apparatus of claim 21, further comprising a transverse brace fastened to each of the frame connection members.

* * * * *